United States Patent

Murray et al.

[11] Patent Number: 5,980,360
[45] Date of Patent: Nov. 9, 1999

[54] METHOD AND APPARATUS FOR PERFORMING WORK OPERATIONS ON A SURFACE OF ONE OR MORE LENSES

[75] Inventors: Jeffrey J. Murray, Ellington; Jonathan M. Dooley, Bolton; Lawrence S. Wolfson, West Hartford, all of Conn.; Paul R. Estabrooks, Monson, Mass.

[73] Assignee: Gerber Coburn Optical, Inc., South Windsor, Conn.

[21] Appl. No.: 09/073,491

[22] Filed: May 6, 1998

[51] Int. Cl.[6] .................................................. B24B 1/00
[52] U.S. Cl. ................................................. 451/5; 451/42
[58] Field of Search .............................. 451/5, 42, 270, 451/273, 272, 283, 285, 290, 380, 387, 405

[56] References Cited

U.S. PATENT DOCUMENTS

| | | | |
|---|---|---|---|
| 2,686,391 | 8/1954 | Porter et al. | 451/284 X |
| 3,205,625 | 9/1965 | Thomas | 451/42 |
| 3,239,967 | 3/1966 | Volk | 451/42 |
| 4,598,502 | 7/1986 | Lombard | 451/42 |
| 4,760,668 | 8/1988 | Schlaefli | 451/273 X |
| 5,027,560 | 7/1991 | Coburn et al. | 451/42 X |
| 5,085,007 | 2/1992 | Tusinski | 451/284 X |
| 5,245,792 | 9/1993 | Liechti et al. | 451/5 |
| 5,498,200 | 3/1996 | Werner | 451/42 X |

FOREIGN PATENT DOCUMENTS 405131350  5/1993  Japan ........................... 451/42

*Primary Examiner*—David A. Scherbel
*Assistant Examiner*—Anthony Ojini
*Attorney, Agent, or Firm*—McCormick, Paulding & Huber

[57] ABSTRACT

In an apparatus for performing work operations on a surface of one or more lenses, a frame and a mounting bracket adapted to releasably support at least one lens blank are provided. At least three pairs of articulated supports are also included with a first end of each of the supports being bendably coupled at a first end to a mounting bracket adjacent to the other articulated support in the pair. The articulated supports are each coupled at a second end to a point on the frame with the supports in each of the pairs diverging away from each other between the mounting block and the frame. A drive is associated with each of the articulated supports and moves each support, and thereby the mounting, individually between a raised and a lowered position in response to commands issued from a controller having data corresponding to a particular lens prescription stored therein. A machining surface is also provided and during operation, as the mounting bracket moves in response to the action of the articulated supports, the lens is engaged with and moves over the machining surface thereby performing a work operation on the lens.

25 Claims, 4 Drawing Sheets

METHOD AND APPARATUS FOR PERFORMING WORK OPERATIONS ON A SURFACE OF ONE OR MORE LENSES

FIELD OF THE INVENTION

The present invention relates to a method and apparatus for shaping a surface on a lens causing the surface to conform to a desired contour, and deals more particularly with a device whereby a lens blank is moved over a lens machining surface by a number of articulated supports, each capable of independent movement between a raised and a lowered position. The combined movement of the articulated supports causes the lens blank to move over the machining surface in response to commands issued from a controller.

BACKGROUND OF THE INVENTION

Ophthalmic, and other types of lenses are typically produced from lens blanks of glass or plastic having two major surfaces, one of which is typically finished, and the other of which is unfinished. Cutting, polishing, and fining operations are performed on the unfinished surface of the lens blank by a machine responsive to data corresponding to a particular lens prescription. The cutting operations are usually accomplished by employing a ball mill for plastic lenses, or a grinder for glass lenses. These cutting operations generally create a lens surface closely approximating the shape of the finished lens. However, the cut surface of the lens blank is often rough and requires that subsequent polishing and fining operations be performed on the lens blank to achieve the requisite optical clarity.

The polishing and fining operations are ordinarily performed by engaging the cut surface of the lens blank with an abrasive surface having a shape that closely approximates the desired finished shape of the lens as defined by the lens prescription. This abrasive surface is referred to by those skilled in the pertinent art as a tool or "lap." During operation, the device to which the lens blank is mounted, moves the blank over the abrasive surface of the lap along a conforming contoured semi-spherical path, thereby polishing and/or fining the lens surface. Laps generally consist of two main components, a mounting surface or mandrel, and a removable abrasive pad that mounts on the mandrel and against which the lens blank is moved during polishing and fining operations. The shape of the mandrel must conform as closely as possible to the prescribed shape of the lens, therefore, different lens prescriptions require different laps to be used.

During polishing and fining operations, it is often necessary to lift the lens blank off of the lap and rinse the abrasive pad to remove lens material in the form of particulate that has built-up during the polishing and/or fining operations. To prevent the abrasive pad from separating from the mandrel during rinsing a releasable adhesive is used to bond the pad to the mandrel. A difficulty associated with adhesively attaching the abrasive pad to the mandrel is that after extended periods of use it is often necessary to change abrasive. The adhesive can make separating the abrasive pad from the mandrel difficult and time consuming. In high production situations where abrasive pads are regularly replaced, significant amounts of time can be lost separating the abrasive pad from the mandrel, thereby adding to the time and expense associated with preparing lenses.

Another difficulty associated with known lens surface generating machinery is that a significant amount of time consuming manual fixturing and set-up prior to beginning a polishing and/or fining operation is usually required. Moreover, the assembly to which the lens blank is mounted is generally comprised of a combination of different parts stacked in series, one-on-top-of-the-other with each part having a machining tolerance associated with it which usually results in the part deviating slightly from its ideal size and geometric configuration. This creates small dimensional differences between mating parts that are unpredictable and which must be compensated for when preparing the machine to generate a lens surface on a lens blank. In addition, the additive nature of these dimensional differences can result in a loss in the overall mechanical stiffness of the machine which translates into reduced machining accuracy. Furthermore, the number of stacked parts and the serial nature of their assembly, usually results in relatively large moving masses that have significant inertia, making precise movement of the lens blank relative to the cutting tool difficult.

Still another difficulty associated with known prior art lens surface generating machinery is that they are typically three axis machines, and as such are limited with respect to the patterns of motion that can be achieved when moving the lens over the abrasive surface of the lap. This limitation on movement often results in a less than ideal finished lens surface. Moreover, the pressure exerted on the lens blank by these known machines is generally not uniform across the surface of the lens, often causing distortions at the periphery of a finished lens.

Based on the foregoing, it is the general object of the present invention to provide a lens surface generating apparatus that overcomes the above-described drawbacks of prior art lens surface generating machines.

It is a more specific object of the present invention to provide a lens surface generating apparatus that does not require extensive manual set-up operations.

It is a further object of the present invention to provide a lens surface generating apparatus whereby an eyeglass manufacturer does not have to maintain a large inventory of laps.

SUMMARY OF THE INVENTION

The present invention is directed to a method and apparatus for performing work operations on a surface of one or more ophthalmic or other lenses. The apparatus includes a frame and a mounting bracket adapted to releasably support at least one lens blank. At least six articulated supports are provided; each articulated support being universally bendably coupled at a first end to a point on the mounting bracket and at a second end to a point on the frame.

The preferred embodiment of the present invention also includes means for independently moving each of the articulated supports between a raised and a lowered position relative to the frame in response to commands issued from a controller that correspond to a desired lens prescription or lens machining pattern. The combined independent motion of each of the articulated supports causes the mounting bracket, and the lens blank coupled thereto, to move in any predetermined pattern relative to, and in engagement with material removal means positioned below and adjacent to the lens blank.

Preferably, the means for independently moving each of the articulated supports relative to the frame includes at least six lead screws rotatably coupled to the frame and upstanding relative thereto. An internally threaded collar is mounted on each lead screw and a mounting block is coupled to each of the threaded collars. Suitable drive means, such as, but not limited to a servo, or stepper motor are also provided and are coupled to each lead screw for selectively rotating the screw in a clockwise or counterclockwise direction in response to commands issued from the controller. As each lead screw is rotated, the associated threaded collar and mounting block travel along the screw's length with the direction of movement being dependent on the direction of rotation of the lead screw. The second ends of each of the articulated supports are coupled to a respective one of the mounting blocks supported by one of the lead screws, so that they also travel with the mounting blocks upon rotation of the lead screws.

In the preferred embodiment of the present invention, the articulated supports are flexible with each including a first cord coupled to one of the points on the mounting bracket, and a second cord coupled to one of the points on the frame. A spring is interposed between, and attached to the first and second cords for maintaining tension on the cords as each flexible member moves between the above-described raised and lowered positions. Since the articulated supports are flexible, they cannot transmit force in compression. Accordingly, a sleeve formed of a suitable material, such as but not limited to a metal or composite, is positioned over each of the flexible supports to transmit compressive forces between the mounting blocks and the mounting bracket. Each sleeve has opposed open ends with each end having an endcap coupled thereto and defining an outwardly extending spherical portion that in turn defines a pair of opposed conical bores, each extending part-way through the spherical portions and having an included angle of approximately 60°. A short straight bore is also defined by each spherical portion and connects the opposed conical bores. The spherical portions of each of the endcaps adjacent to the frame are rotatably received in a mating spherical recess defined by a respective one of the mounting blocks.

In addition, three support retainers, each spaced approximately 120° from the next successive support retainer are coupled to the mounting bracket. Each support retainer defines a pair of mating spherical recesses adapted to rotatably receive the spherical portion of each of the endcaps adjacent to the mounting bracket.

The spherical portions of each of the endcaps also define a peripheral surface having a lip protruding therefrom and extending there around. Each of the cords comprising part of the flexible articulated supports extends through a corresponding one of the sleeves, as well as through the conical bores defined by the spherical portions of the endcaps, and are retained in the above-described straight bores defined by the endcaps. The articulated supports are also universally bendably coupled at a first end to a point in the mating spherical recess defined by the mounting bracket, and at a second end to a point within the mating spherical recess defined by the corresponding mounting block. During operation of the apparatus, the spherical portion of the endcaps rotate within the mating spherical recesses defined by the mounting blocks and support retainers, as well as within the ends of the sleeve to which they are coupled. The lips limit the amount by which the spherical portions of the endcaps can rotate within the mating recesses defined by the mounting blocks and support retainers, which in turn prevents the cords extending through the endcaps from being pressed against the associated sleeve interior and cut by an edge of the endcap through which the cord passes. The conical bores defined by the spherical portions of the endcaps also prevent the cords from being cut by eliminating any sharp edges that the cords could contact during operation of the apparatus.

Preferably, the material removal means takes the form of a lap consisting of a mandrel having a surface contoured in accordance with the desired lens prescription, and an abrasive pad covering the contoured surface. During operation, the lens blank is brought into engagement with, and moved over the abrasive pad in response to commands issued from the controller.

In the preferred embodiment, the mounting bracket is comprised of an inner ring for supporting the lens blank, and an outer ring approximately concentric with the inner ring. A diaphragm is coupled to, and extends between the inner and outer rings. Preferably, the diaphragm is a thin metallic disc that is flexible vertically, but substantially rigid torsionally. The flexible characteristics of the diaphragm cause the lens blank to exert pressure on the abrasive pad along a line that is orthogonal to the contoured surface. While a metallic diaphragm has been described, the present invention is not limited in this regard as other materials, such as rubber can be substituted without departing from the broader aspects of the present invention.

The present invention can also include a calibration plate positioned above the articulated supports and mounted to the frame at a known location, adjacent to the mounting blocks. During operation, and prior to machining a lens, the mounting blocks can be moved into contact with the calibration plate, thereby providing a known starting point or home position for the articulated supports. This position can be stored in the controller, and the movements of the articulated supports coordinated by the controller relative to this known position. This is especially beneficial when components are repaired, altered, or replaced. In these situations individual parts may not be in exactly the same location as they were prior to the repair, alteration, or replacement. By moving the mounting blocks into contact with the calibration plate, the home position of all of the articulated supports can be reset and stored in the controller, thereby ensuring that movement of each support relative to the others is in accordance with the lens prescription data stored in the controller. In addition, since the mounting blocks are brought into engagement with the calibration plate, it is preferable that the calibration plate be spring loaded in order to cushion the impact of the mounting blocks and avoid damaging the apparatus.

In another aspect of the present invention, a pneumatic cylinder that includes a rod movable between an extended and a retracted position, can be provided. The pneumatic cylinder is coupled to an adapter that in turn is coupled to the mounting bracket. The adapter defines an aperture positioned over the lens blank retained by the mounting bracket. The rod of the pneumatic cylinder extends through the aperture and can be selectively extended or retracted in response to commands issued from the controller. During operation, as the rod is extended, it engages the lens blank exerting a predetermined amount of pressure thereon. This pressure helps to equalize the distribution of forces across the surface of the lens blank and the abrasive surface of the lap.

The present invention also resides in a method of producing a lens that includes, providing an apparatus as described above and a controller in communication with said apparatus and having machine readable lens prescription data stored therein. The apparatus is operated in response to commands issued from the controller to cause the means for independently changing the positional relationship of each of the articulated supports relative to the frame to move the lens blank into engagement with the material removal means. The lens blank is then moved by the apparatus in response to the machine readable lens prescription data, over the material removal means, thereby polishing and/or fining the lens blank.

In addition, in the above-described method, the material removal means can be a lap having a contoured surface corresponding to the desired shape of a finished lens, and an abrasive surface overlying and not bonded to the contoured surface. With the lens blank engaging the abrasive surface, the apparatus can be operated to move the lens blank over to a point where approximately a first half of the abrasive surface is exposed. This exposed surface can then be rinsed with a cleaning solution to remove particulate generated during the fining and/or polishing operations. The apparatus can then be operated to move the lens blank again, to expose approximately a second half of the abrasive surface. The second half of the abrasive surface can then be rinsed with a cleaning solution to remove particulate generated during the fining and/or polishing operations.

DETAILED DESCRIPTION OF THE PREFERRED EMBODIMENTS

Figure 1:
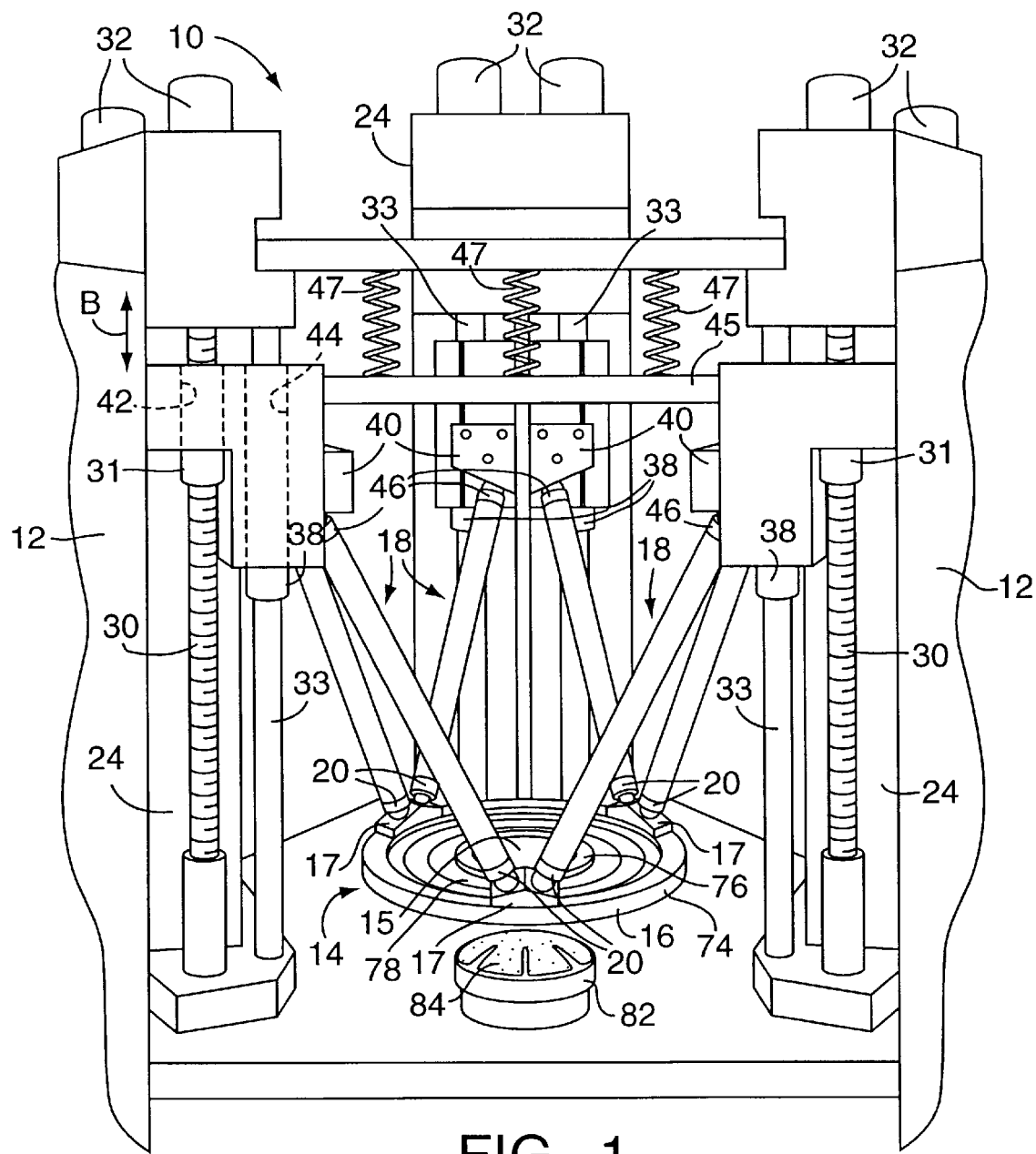
FIG. 1 is a perspective view of the apparatus of the present invention.

In FIG. 1, an apparatus for generating lens surfaces embodying the present invention is indicated generally by the reference numeral 10 and includes a frame 12, and a mounting bracket 14 for supporting a lens blank 15. The mounting bracket 14 defines a peripheral edge 16 and three support retainers 17 are attached to the mounting bracket adjacent to, and spaced approximately 120° apart from each other about the peripheral edge. The support retainers 17 are each adapted to retain a pair of articulated supports 18 bendably coupled at a first end 20 to adjacent points on a respective one of the support retainers.

At least three upstanding columns 24 are attached to the frame 12 and are positioned approximately 120° away from each other such that they inscribe a circle "A" with the mounting bracket 14 positioned below the columns within the inscribed circle. A pair of substantially parallel upstanding lead screws 30 are rotatably supported by each of the columns 24, and a servo 32 is coupled to each of the lead screws 30 for independently rotating the screw in a clockwise or counterclockwise direction in response to commands issued from a controller (not shown). A collar 31 is threadedly coupled to each lead screw 30 for movement between a raised and a lowered position in response to rotation of the associated lead screw. While a servo has been described, the present invention is not limited in this regard as other means for driving each lead screw, such as, but not limited to a stepper motor can be substituted without departing from the broader aspects of the present invention. In addition, while columns 24 have been shown and described, the present invention is not limited in this regard as other support systems known to those skilled in the pertinent art can be substituted without departing from the broader aspects of the present invention. Furthermore, while the articulated supports, and the lead screws, have been shown and described as being mounted in pairs, the present invention is not limited in this regard as several different combinations and mounting arrangements can be employed without departing from the broader aspects of the invention.

Still referring to FIG. 1, a pair of rails 33 shown in the illustrated embodiment as, but not limited to, cylindrical bars are also mounted to each of the columns 24. Each rail 33 is spaced away from and approximately parallel to a respective one of the lead screws 30 and has a bushing 38 slidably mounted thereon. Six mounting blocks 40 are also provided, with each mounting block defining a first aperture 42 adapted to receive and retain one of the threaded collars 34, and a second aperture 44 adapted to receive and retain one of the bushings 38. Accordingly, rotation of one of the lead screws 30 will cause the associated threaded collar 34 and thereby the mounting block 40 to move along the lead screw between the raised or lowered position as indicated by the arrow "B". As the mounting blocks 40 move, the ball bushings 38 slide linearly along the rails 33 with the rails acting to prevent rotation of the mounting blocks about the lead screws 30. In addition, the present invention also includes a calibration plate 45 positioned adjacent to the mounting blocks 40. During operation, the mounting blocks can be moved into contact with the calibration plate, thereby providing a known starting point or home position for the articulated supports. This position can be stored in the controller, and the movements of the articulated supports coordinated by the controller relative to this known position.

As shown in FIG. 1, in addition to being bendably attached at a first end to one of the support retainers 17, the articulated supports 18 in each of the above-described pairs diverge away from each other toward the frame with one of the articulated supports in each pair being bendably attached at a second end 46 to a point on a respective one of the mounting blocks 40 supported by one of the columns 24, with the other articulated support in the pair being attached to another mounting block supported by the next successive column. In addition, since the mounting blocks 40 are brought into engagement with the calibration plate 45, it is preferable that the calibration plate be spring loaded with springs 47 in order to cushion the impact of the mounting blocks and avoid damaging the apparatus.

Figure 2:
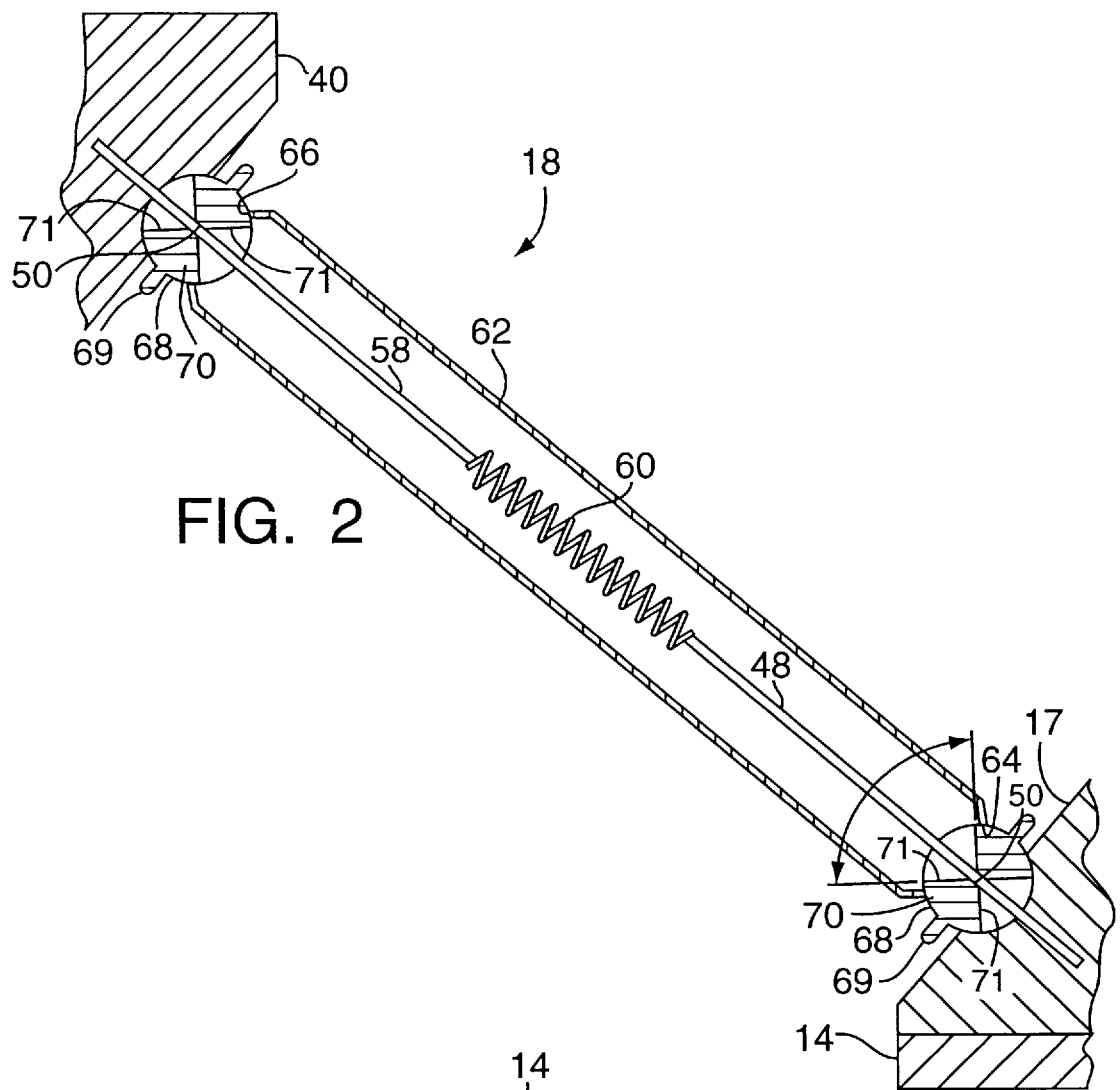
FIG. 2 is a partly in section front elevational view of one of the articulated supports of the apparatus of FIG. 1 shown attached at one end to the mounting bracket, and at an opposite end to one of the mounting blocks.

As shown typically in FIG. 2, each of the articulated supports 18, includes a first flexible cord 48 coupled at one end to the mounting bracket 14 and a second flexible cord 58 connected at one end to a respective one of the mounting blocks 40. A spring 60 is interposed between and connected to the first and second flexible cords, 48 and 58 respectively. During operation of the apparatus 10, the spring 60 maintains tension on the cords as the mounting blocks 40 move between the above-described raised and lowered positions. The first and second cords, 48 and 58 respectively, are each made from a suitable material, such as but not limited to Vectran® manufactured by Hoechst AG.

Since the first and second cords, 48 and 58 respectively, are flexible; compressive forces cannot be transmitted along their respective lengths. Therefore, a sleeve 62 fabricated from a suitable material, such as, but not limited to metal, plastic, or a composite, is positioned over each of the articulated supports 18, with each sleeve defining a first open end 64 adjacent to the mounting bracket 14, and a second open end 66 adjacent to a respective one of the mounting blocks 40. Two endcaps 68 are provided with one being rotatably coupled to each of the first and second open ends 64 and 66 respectively, of each sleeve 62. Each endcap 68 defines a spherical portion 70 extending outwardly from the associated sleeve and seated in a mating spherical recess defined by each of the mounting brackets 40 and the support retainers 17. A lip 71 extends around the spherical portion 70 of each endcap 68 to limit the amount by which the spherical portions 70 can rotate in either the sleeve 62 or the matting spherical recess. The spherical portions 70 of each of the endcaps, define a pair of opposed conical bores 71 extending part-way through the spherical portions 70. Each conical bore defines an included angle denoted by the symbol φ in FIG. 2, and is preferably approximately 60°. A centrally located straight bore 50 is also defined by each of the spherical portions 70 and connects the opposed conical bores 71.

The first and second flexible cords, 48 and 58 respectively, each extend through conical bores 71 defined by the spherical portions 70 of the endcaps 68 and are retained by the straight bore 50. In addition, each first cord 48 is attached to one of the support retainers 17, and each second cord 58 is attached to one of the mounting blocks 40. Accordingly, during operation of the apparatus 10, the movement of the articulated supports causes the first and second cords, 48 and 58 respectively, to universally bend within the spherical portions 70 of the endcaps 68, with no concomitant increase in the length of the first or second cords. While the articulated supports have been described as including spherical end caps, the present invention is not limited in this regard as other types of end caps, such as universal joints can be substituted without departing from the broader aspects of the present invention.

During operation, as the mounting blocks 40 and thereby the articulated supports 18 move between the raised and the lowered positions, the spherical portions 70 of the endcaps 68 rotate within the first and second open ends 64 and 66 respectively, of each sleeve 62, as well as within the corresponding mating recesses defined by the support retainers 17 and the mounting blocks 40. If the spherical portions 70 of the endcaps 68 are allowed to rotate an excessive amount within the associated sleeves 62, or the associated mating recesses, there is the tendency for the first and second cords, 48 and 58 respectively to become pressed against an inner surface of the sleeve and be cut by an edge 73 of the endcap. To prevent this from happening, the lips 71 engage the sleeves 62 before the first or second cord 48 or 50 respectively, become pressed against the sleeve. In this manner, the amount by which the endcap 68 can rotate is limited, preventing any of the cords from being cut. In addition, the conical bores 73 defined by the spherical portions 70 of the endcaps 68 also aid in preventing the cords from being cut during operation by eliminating any sharp edges with which the cords could come into contact.

While the means for moving each of the articulated supports 18 relative to the frame has been shown and described as comprising a series of lead screws 30 connected to servos, each for driving a mounting block 40, having an articulated support coupled thereto, along the screws length, the present invention is not limited in this regard as other configurations can also be employed. For example, the articulated supports 18 shown in FIG. 1 and described above, could be actuated by a pneumatic or hydraulic piston, or a tubular member positioned over each lead screw. Each tubular member could be attached at one end to the associated threaded collar and at an opposite end to the articulated support via a universal or other joint arrangement. Such an apparatus is shown and described in U.S. Pat. No. 5,053,687 to Jean-Pierre Merlet of Antibes, France, filed on Mar. 15, 1989, issued on Oct. 1, 1991, and assigned to Inria Institut National de Recherche En Information et en Automotique.

Figure 3:
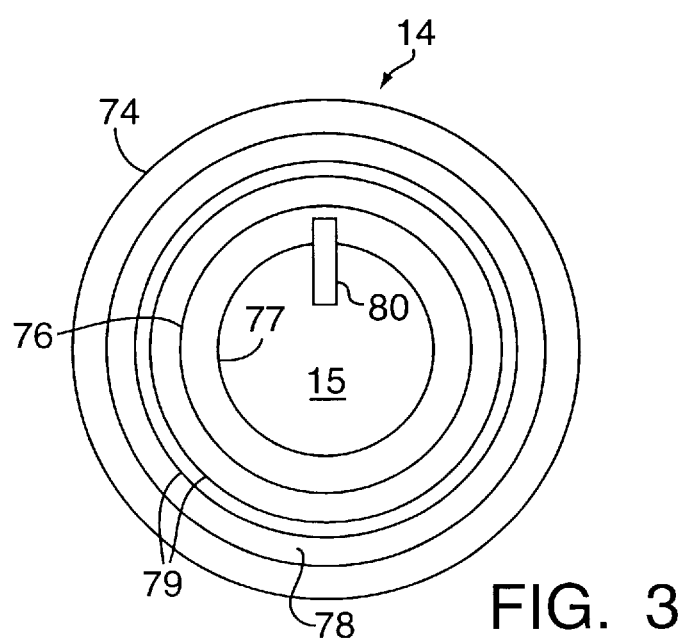
FIG. 3 is a plan view of the mounting bracket of the apparatus of FIG. 1.

As shown in FIG. 3, the mounting bracket 14 also includes an outer ring 74 and an inner ring 76, the inner ring being approximately concentric with the outer ring and defining a bore 77 extending therethrough. A clamp 80 for releasably retaining a lens blank 15 in the bore 77 is connected to an upper side of the inner ring 74, and a flexible diaphragm 78 is interposed between and attached to the outer and the inner rings, 74 and 76 respectively. The diaphragm 78 illustrated in FIG. 3 is preferably formed from a thin metallic material having a plurality of spaced-apart approximately concentric circular indentations 79 extending across the diaphragm. The indentations 79 allow the diaphragm to be flexible in a direction perpendicular to the lap 82, yet retain torsional rigidity. While the mounting bracket 14 has been shown and described as including an outer and inner ring, 74 and 76 respectively, the present invention is not limited in this regard, as square, triangular, rectangular, or other shaped elements can be substituted without departing from the broader aspects of the present invention. In addition, while the diaphragm 78 has been described as being fabricated from a metallic material, the present invention is not limited in this regard as other materials, such as, but not limited to rubber, or plastic, can be substituted without departing from the broader aspects of the present invention.

Referring back to FIG. 1, as the apparatus 10 is operated, the lens blank 15 engages a lap 82, that defines an abrasive surface 84 preferably shaped to conform to the final contour of a finished lens as defined by a particular lens prescription. The lens blank is moved via the articulated supports 18 over the abrasive surface, thereby polishing the lens blank surface. Since there are instances where a lens prescription calls for the finished lens to have a contour that does not conform to a given lap, or the required lap is not on hand, it is desirable to have a single lap whereby the contour of the abrasive surface can be varied to accommodate any described lens shape.

During operation, the lens blank 15 is brought into engagement with the abrasive surface 84 of the lap 82. The servos 32 are operated, rotating the lead screw 30 and causing the mounting blocks 40 to selectively and independently move along the lead screws between the raised and lowered position in response to commands issued from the controller. This in turn, causes each of the articulated supports 18 to move in accordance with the motion of the associated mounting block 40 thereby forcing the mounting bracket 14 and the lens blank 15 to move in a predetermined pattern over the abrasive surface 84 of the lap 82 as dictated by the machine readable lens prescription data stored in the controller.

In addition to the foregoing, it is often necessary to rinse particulate generated during a polishing or fining operation, from the abrasive surface 84 of the lap 82. This is generally accomplished by lifting the lens blank 15 off of the abrasive surface 84 of the lap 82 and rinsing the abrasive surface with water or a cleaning solution. However, even with repeated cleanings, the abrasive surface of the lap eventually wears and must be replaced. To facilitate replacement of the abrasive surface 84 and to prevent it from being washed from the lap 82 during a rinsing process, the abrasive surface is usually attached to the lap with a removable adhesive. However, after prolonged periods of use, the adhesive bond between the abrasive surface and the lap can be difficult to overcome. An advantage of the apparatus of the present invention is that an abrasive surface can be positioned to overlie the contoured surface of the lap and can be used without the need for the aid of the adhesive.

During a rinsing process, the articulated supports can be actuated such that the lens blank 15 is slid across the abrasive surface 84 of the lap 82. This exposes one-half of the abrasive surface, which can then be rinsed. The articulated supports can then be actuated to cause the lens blank 15 to move across the abrasive surface 84 to expose the other, uncleaned half of the abrasive surface which can then be rinsed. In this manner the need for the adhesive to hold the abrasive surface on the lap is obviated as the lens blank 15 is used to hold the abrasive surface in place on the lap.

Figure 4:
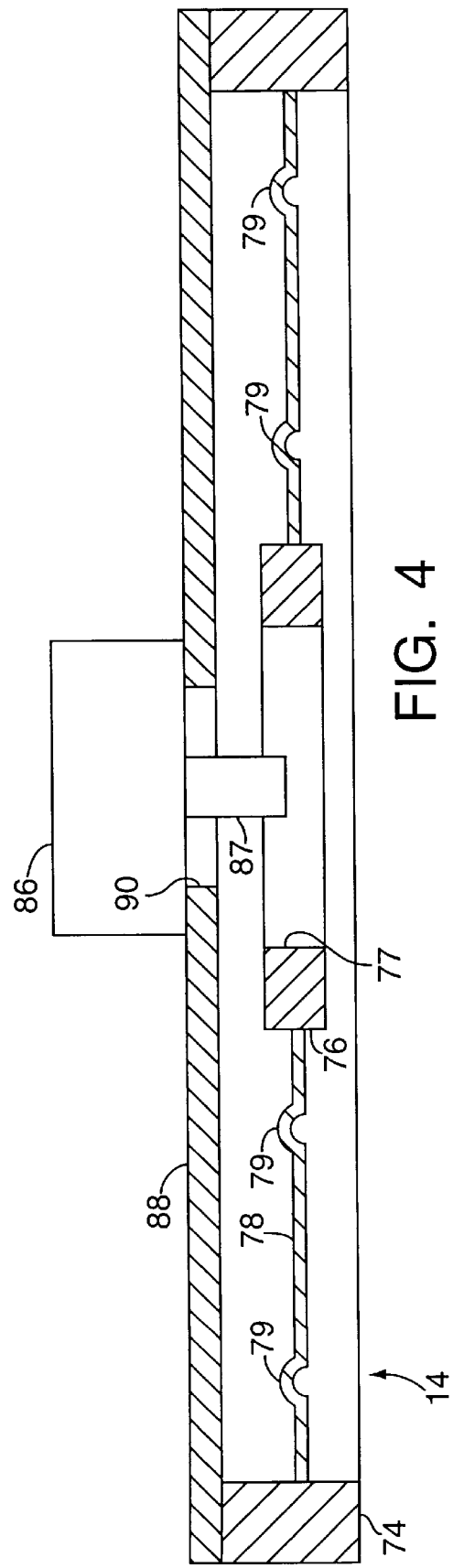
FIG. 4 is a partly-in-section, side elevational view of the mounting bracket of FIG. 3 showing an air cylinder mounted to the bracket adjacent to the lens blank for selectively exerting pressure on the blank during a polishing and/or fining operation.

As shown in FIG. 4, a pneumatic cylinder 86 having a rod 87 movable between an extended and retracted position can also be included to exert pressure on the lens blank 15 during a polishing or fining operation. The pneumatic cylinder 86 is mounted on a support 88 which in turn is attached to the mounting bracket 14. The support 88 defines an aperture 90 positioned over the lens blank 15, and through which the rod 87 extends.

During operation, as the lens blank is brought into engagement with the abrasive surface 84 of the lap 82, the cylinder 86 can be selectively actuated, in response to commands issued from the controller causing the rod 87 of the cylinder to extend and exert pressure, in addition to that already exerted by the articulated supports, on the lens blank 15. This additional pressure aids in equalizing the distribution of pressure across the surface of the lens blank 15 as it contacts the abrasive surface 84 of the lap 82. The even pressure distribution allows the entire lens surface to be polished and/or fined without generating discontinuities adjacent to the periphery of the lens blank, as is common in prior art devices.

Figure 5:
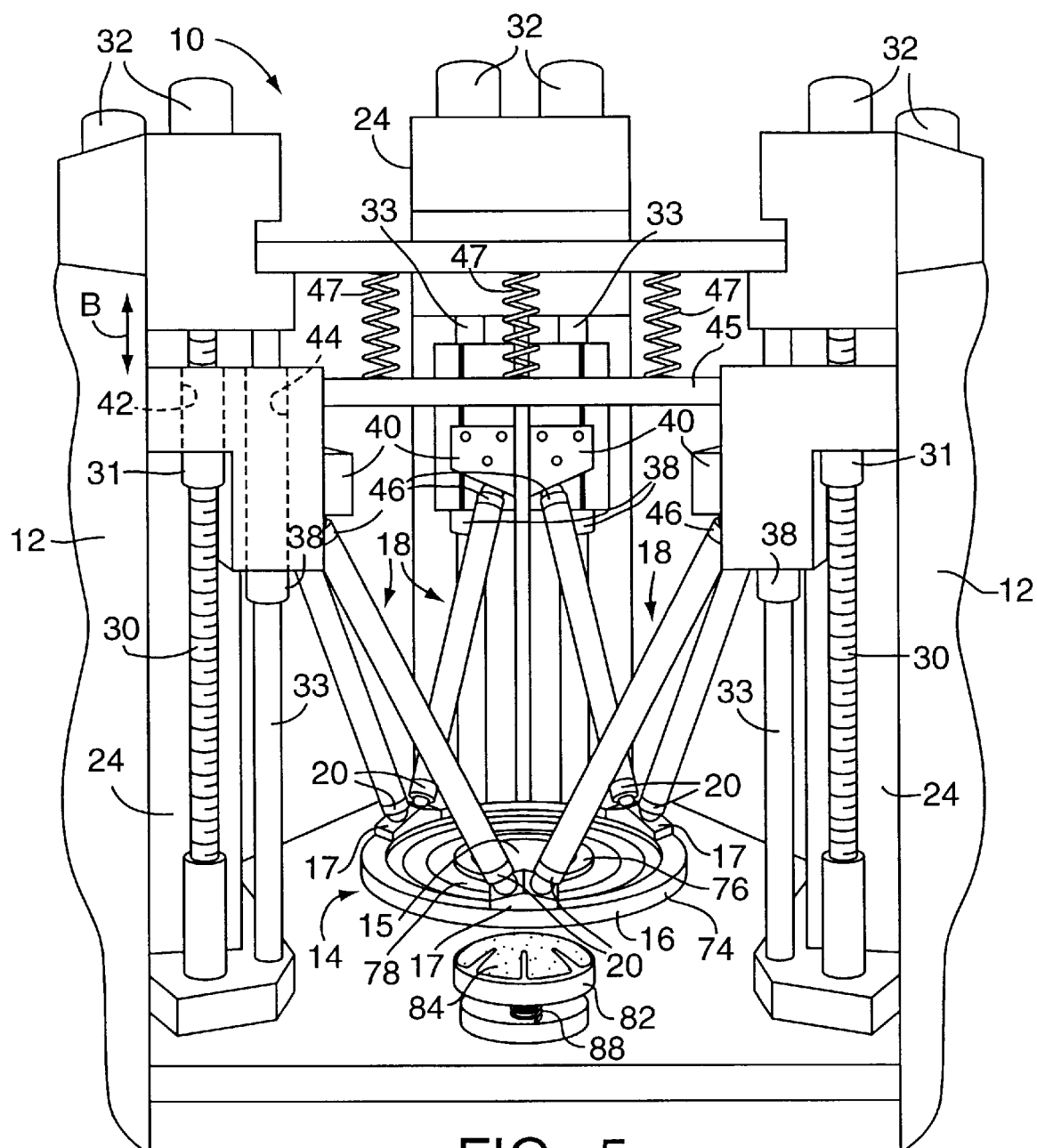
FIG. 5 is a side elevational view of the apparatus of the present invention showing a spring-loaded lap for biasing the abrasive surface of the lap against the lens blank during a polishing and/or fining operation.

An alternative to employing the cylinder 86 is illustrated in FIG. 5 and employs the use of a spring-loaded lap. As shown, a spring 88 can be positioned under the lap 82 for urging the abrasive surface 84 against the lens blank 15, this would have an effect similar to that of the above-described cylinder 86, in that an even distribution of pressure between the lens blank 15 and the abrasive surface would be achieved. While a spring 88 has been shown and described, other means for urging the abrasive surface 84 against the lens blank 15, such as a pneumatic or hydraulic cylinder can be substituted without departing from the broader aspects of the present invention.

While preferred embodiments have been shown and described, various modifications and substitutions may be made without departing from the spirit and scope of the present invention. Accordingly, it is to be understood that the present invention has been described by way of example, and not by limitation.

What is claimed is:

1. An apparatus for performing work operations on a surface of at least one lens, comprising:
   a frame;
   a mounting bracket adapted to releasably support at least one lens blank;
   at least six elongated articulated supports positioned between said frame and said mounting bracket, each of said supports having a first end universally and bendably coupled to a point on said mounting bracket and a second end universally and bendably coupled to a point on said frame;
   means for independently changing the positional relationship of each of said articulated supports relative to said frame and mounting bracket to in turn change the positional relationship of said mounting bracket relative to said frame;
   a controller for issuing commands to said apparatus for controlling the positional relationship of all of said articulated supports and said mounting bracket relative to said frame; and
   means for removing material from said surface of said lens blank in response to said movement of said mounting bracket relative to said frame caused by said commands.

2. An apparatus for performing work operations on a surface of at least one lens as defined by claim 1, wherein each support is constant length and the change in positional relationship is effected by moving the second end of the support relative to the frame.

3. An apparatus for performing work operations on a surface of at least one lens as defined by claim 1, wherein said articulated supports are flexible.

4. An apparatus for performing work operations on a surface of at least one lens as defined by claim 3, wherein each of said articulated supports includes:
   at least one cord having one end coupled to a respective one of said mounting bracket and said frame; and
   a spring coupled at a first end to an opposite end of said cord, and at a second end to the other of said mounting bracket and said frame.

5. An apparatus for performing work operations on a surface of at least one lens as defined by claim 4, wherein said spring is a coil spring.

6. An apparatus for performing work operations on a surface of at least one lens as defined by claim 4, wherein said spring is a strip of elastomeric material.

7. An apparatus for performing work operations on a surface of at least one lens as defined by claim 4, wherein each of said articulated supports comprises:
   a first cord coupled at a first end to said mounting bracket;
   a second cord coupled at a second end to said frame; and wherein
   said spring is interposed between and coupled at one end to a second end of said first cord, and at an opposite end to a second end of said second cord, for maintaining tension in said first and second cords as each of said articulated supports moves relative to said frame in response to commands issued from said controller.

8. An apparatus for performing work operations on a surface of at least one lens as defined by claim 7, wherein said means for independently moving each of said articulated supports relative to said frame further comprises:
   at least six elongated lead screws rotatably coupled to said frame and upstanding relative thereto;
   at least six rails coupled to said frame, each being approximately parallel to and spaced away from a respective one of said lead screws;
   at least six bushings, each mounted to a respective one of said rails for linear movement along the length of said rail;
   at least six collars, each threadably and rotatably mounted to a respective one of said lead screws;
   each of said mounting blocks being coupled to a respective one of said bushings and said collars; and
   drive means for independently rotating each of said lead screws in response to commands issued from said controller, to cause each mounting blocks and thereby said articulated supports to move along said rails and said lead screws between said raised and lowered positions.

9. An apparatus for performing work operations on a surface of at least one lens as defined by claim 8, wherein:

said frame defines at least three upstanding columns positioned approximately 120° apart and inscribing a circle, each column being adapted to rotatably support a pair of said lead screws and their associated mounting blocks, said leads screws being positioned approximately parallel to each other;

said mounting bracket is positioned within said inscribed circle; and wherein said articulated supports diverge radially away from said mounting bracket and from each other, each articulated support being coupled to a respective one of said mounting blocks.

10. An apparatus for performing work operations on a surface of at least one lens as defined by claim 9, further comprising:

at least three support retainers coupled to said mounting bracket and spaced approximately 120° from the next successive support retainer, each adapted to bendably rotatably receive said spherical portions of said articulated endcaps.

11. An apparatus for performing work operations on a surface of at least one lens as defined by claim 8, wherein said drive means includes at least six servos, each coupled to a respective one of said lead screws, for independently rotating said lead screws in response to commands issued from said controller.

12. An apparatus for performing work operations on a surface of at least one lens as defined by claim 8, wherein said drive means includes at least stepper motors, each coupled to a respective one of said lead screws, for independently rotating said lead screws in response to commands issued from said controller.

13. An apparatus for performing work operations on a surface of at least one lens as defined by claim 1, wherein:

said means for independently moving each of said articulated supports relative to said frame includes at least six mounting blocks coupled to said frame for independent movement between said raised and said lowered positions in response to commands issued from said controller; and wherein said second end of each of said articulated supports is coupled to a respective one of said mounting blocks.

14. An apparatus for performing work operations on a surface of at least one lens as defined by claim 13, further comprising a calibration plate positioned adjacent to said mounting blocks and against which said mounting blocks can be driven prior to a work operation to establish a known starting position for said work operation.

15. An apparatus for performing work operations on a surface of at least one lens as defined by claim 1, further comprising:

means for moving said points on said mounting bracket in a generally downward direction as each of said flexible articulated supports moves from said raised to said lowered position.

16. An apparatus for performing work operations on a surface of at least one lens as defined by claim 15, wherein said means for moving said points on said mounting bracket in a generally downward direction includes:

a sleeve positioned over each of said flexible articulated supports and defining a first open end adjacent to said mounting bracket, and a second open end adjacent to a respective one of said mounting blocks;

an endcap coupled to each of said first and second ends of each of said sleeves, each endcap defining a spherical portion rotatably positioned in mating spherical recesses defined by said mounting plate and said mounting blocks; and wherein each of said flexible articulated supports extends through said endcaps and is universally bendably coupled at a first end to a point within said mating spherical recesses defined by said mounting plate, and at a second end to a point within said mating spherical recesses defined said mounting blocks.

17. An apparatus for performing work operations on a surface of at least one lens as defined by claim 16, wherein:

said spherical portion of said endcaps each defines a lip extending around a periphery defined by said spherical portion, to limit the amount by which said spherical portion can rotate within said sleeve and said mating spherical recesses defined by said mounting blocks and said mounting bracket.

18. An apparatus for performing work operations on a surface of at least one lens as defined by claim 17, wherein:

each of said spherical portions defines a pair of opposed conical bores each extending at least part-way through said spherical portion, and a straight bore positioned between and in communication with the pair of opposed conical bores; and wherein the flexible articulated supports are retained in the straight bore.

19. An apparatus for performing work operations on a surface of at least one lens as defined by claim 18, wherein each of the conical bores defines an included angle of approximately 60°.

20. An apparatus for performing work operations on a surface of at least one lens as defined by claim 1, wherein:

said means for removing material from said surface of said lens is a lap; and said lap defines an abrasive surface shaped to conform to the contours of a finished lens as defined by said lens prescription.

21. An apparatus for performing work operations on a surface of at least one lens as defined by claim 20, wherein said lap is spring-loaded to drive said abrasive surface into said lens blank during a work operation.

22. An apparatus for performing work operations on a surface of at least one lens as defined by claim 1, wherein said mounting bracket includes:

an inner support member adapted to retain said lens blank;

an outer support member having said second ends of said articulated supports coupled thereto; and a diaphragm interposed between and coupled to the inner and outer support members to compensate for any misalignment of said articulated supports as said lens surface engages and is moved over said abrasive in response to commands issued from said controller.

23. An apparatus for performing work operations on a surface of at least one lens as defined by claim 22, wherein said diaphragm is formed from an elastomeric material.

24. An apparatus for performing work operations on a surface of at least one lens as defined by claim 22, wherein said diaphragm is formed from a metallic material.

25. An apparatus for performing work operations on a surface of at least one lens as defined by claim 24, wherein said diaphragm includes a plurality of approximately concentric, spaced-apart indentations.

* * * * *